US008957363B2

(12) United States Patent
Atzler et al.

(10) Patent No.: US 8,957,363 B2
(45) Date of Patent: Feb. 17, 2015

(54) DIFFERENTIAL PHOTODIODE INTEGRATOR CIRCUIT FOR ABSORBANCE MEASUREMENTS

(71) Applicant: Molecular Devices, LLC, Sunnyvale, CA (US)

(72) Inventors: Josef J. Atzler, Hallein (AT); Bernhard Schinwald, Munderfing (AT)

(73) Assignee: Molecular Devices, LLC, Sunnyvale, CA (US)

(*) Notice: Subject to any disclaimer, the term of this patent is extended or adjusted under 35 U.S.C. 154(b) by 303 days.

(21) Appl. No.: 13/737,317

(22) Filed: Jan. 9, 2013

(65) Prior Publication Data
US 2014/0192360 A1    Jul. 10, 2014

(51) Int. Cl.
*H01J 40/14*    (2006.01)
*G01J 1/44*    (2006.01)

(52) U.S. Cl.
CPC .......................................... *G01J 1/44* (2013.01)
USPC ................................ 250/214 R; 250/214 LA (58) Field of Classification Search
USPC ................. 250/214 R, 214 LA, 214.1, 208.1; 327/514, 515, 108, 509; 257/239, 292, 257/355, 443
See application file for complete search history.

(56) References Cited

U.S. PATENT DOCUMENTS 5,340,974 A * 8/1994 Zalewski ...................... 250/205

* cited by examiner

*Primary Examiner* — Que T Le
(74) *Attorney, Agent, or Firm* — Bella Fishman (57) ABSTRACT

Systems and methods for measuring a light intensity. An example photodetector measurement circuit comprises a photodetector that receives a light and generates a photodetector current indicative of the light intensity. The measurement circuit includes a first integrator coupled along a first signal path to the photodetector to generate a first voltage signal at a first integrator output indicative of an integral of the photodetector current level. A second integrator is configured to generate a second voltage signal at a second integrator output indicative of an integral of the photodetector current level. A differential amplifier receives the first voltage signal and the second voltage signal and generates a third output signal at a differential amplifier output indicative of a difference between the first voltage signal and the second voltage signal. The differential amplifier outputs the third voltage signal to an analog-to-digital conversion function ("ADC function") input.

20 Claims, 4 Drawing Sheets

DIFFERENTIAL PHOTODIODE INTEGRATOR CIRCUIT FOR ABSORBANCE MEASUREMENTS

TECHNICAL FIELD

This present invention generally relates to light-sensing measurement systems, and more particularly, to systems and methods using photodetector integrator circuits.

BACKGROUND

Photodetectors are devices used to receive a light signal and to generate an electrical signal indicative of the light signal intensity. Examples of photodetectors include a photodiode, a photomultiplier tube ("PMT"), an avalanche photodiode, and other light-detecting devices. Typically, the photodiode generates a current that corresponds to the intensity of light it receives. Photodiodes and other photodetectors typically use an integrating circuit to translate the current received into a voltage signal that is indicative of the intensity or power of the light over a period of time. Integration circuits are well known and operational amplifier ("op-amp") circuits that integrate an input signal are well known. Integrator circuits have been employed to receive the photodiode current level and to generate a voltage value indicative of the integral of the current over a period of time.

Systems that employ photo detectors and integrator circuits are evolving into systems that are more general or open in implementation. That is, such measurement circuits are now required to process more general light inputs. Accordingly, the measurement circuits may need to provide signal-to-noise ratios ("SNR") and dynamic ranges that are adequate for a variety of scenarios. In an absorption measurement system, a typical integrator circuit may not be sufficient to provide satisfactory SNR to exceed a 4OD ("optical density") dynamic range over given wavelength range (200-1000 nm); particularly if weak flash lamps are used. The absorbance measurement systems may include optical components (light source, lenses, mirrors, gratings etc) in the light path for the light to be measured that have a varying optical behavior over the desired wavelength range. This variability may result in different SNR values depending on the selected wavelength.

Accordingly, the dynamic range of 4OD, which may often be the desired dynamic range, may only be reached using additional electronics such as, for example, programmable amplifiers and/or avalanche photodiode (APD) detectors. The use of additional electronics results in time consuming adjustment routines during manufacturing, which may also impact the flexibility of the system. In addition, APDs may be too expensive and overly sensitive to the ambient environment.

In view of the above, there is a need in the art for light measurement systems that permit variably fast adjustment of the light source output and of the dynamic range of the signal measurement.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a system is provided for measuring a light intensity. An example photodetector measurement circuit comprises a photodetector that receives a light and generates a photodetector current indicative of the light intensity. The measurement circuit includes a first integrator coupled along a first signal path to the photodetector to generate a first voltage signal at a first integrator output indicative of an integral of the photodetector current level. A second integrator is configured to generate a second voltage signal at a second integrator output indicative of an integral of the photodetector current level. A differential amplifier receives the first voltage signal and the second voltage signal and generates a third output signal at a differential amplifier output indicative of a difference between the first voltage signal and the second voltage signal. The differential amplifier outputs the third voltage signal to an analog-to-digital conversion function ("ADC function") input.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
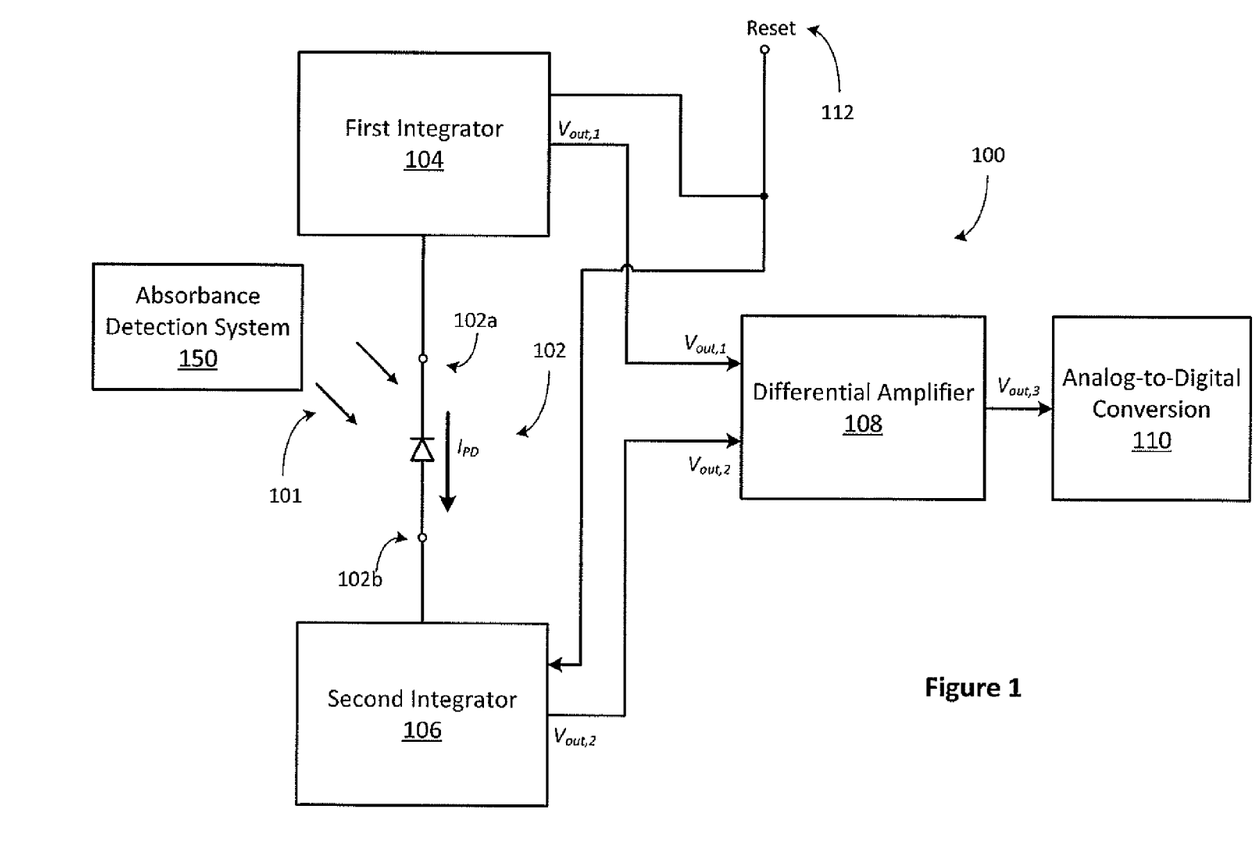
FIG. 1 is a block diagram of an example of a system for measuring a light level.

FIG. 1 is a block diagram of an example system 100 for measuring a light level using a photodetector 102. The system 100 includes a first integrator circuit 104, a second integrator circuit 106, a differential amplifier 108, and an analog-to-digital conversion ("ADC") function 110. The system 100 may be used in a detection system or light measurement system in which meaningful information may be obtained from the intensity of a light 101 directed at the photodetector 102. For example, the system 100 may be implemented as a component in an absorbance detection system 150. The absorbance detection system 150 may include an excitation light source directed by an optical path configured using optical components such as mirrors, lenses, beam splitters, and other suitable components that may direct the light source to a sample. The sample may absorb a portion of the excitation light and transmit a remaining part of the excitation light. The excitation light may have an intensity that is either known or measured using another light measurement circuit. The transmitted light emitted from the sample (shown in FIG. 1 as the light 101) may be directed to the photodetector 102 for measurement of its light intensity. By measuring the light intensity of the transmitted light 101, and using the known intensity of the excitation light, the intensity of the light that was absorbed by the sample may be determined. The light intensity absorbed by the sample may provide desired information about the sample.

Descriptions of examples herein focus on photodetectors used for absorbance measurements. However, examples of implementations of the systems and methods described herein may be adapted for use in any system in which a photodetector generates an electrical signal that is measurable across opposite terminals in response to being illuminated by a light.

The photodetector 102 is described herein as being a photodiode for purposes of illustration. Those of ordinary skill in the art will understand that other photosensitive devices where an electrical signal is generated across two terminals in response to a light may be used as the photodetector 102 as well. Examples of other light-sensitive devices that may be used include a PMT and an avalanche photodiode. It is noted that PMTs and avalanche photodiodes are typically packaged as devices having more than two pins, and may require a power capacity different from that of a photodiode. Those of ordinary skill in the art will understand the differences between these light-sensitive devices and the photodiodes referred to in this description as well as how to configure these and any other suitable light-sensitive devices for operation as 'photodetectors' in the context of this disclosure.

Referring to FIG. 1, the photodetector 102 receives the light 101 and generates a photodetector current, $I_{PD}$, that flows from a first terminal 102a to a second terminal 102b as shown in FIG. 1. The photodetector 102 may be connected to the first integrator 104 at the first photodetector terminal 102a and to the second integrator 106 at the second photodetector terminal 102b. The photodetector current $I_{PD}$, is detected by the first integrator 104 and by the second integrator 106 via their respective connections to the first and second photodiode terminals 102a and 102b, respectively.

In general, the light 101 may illuminate the photodetector 102 in light pulses where an individual light pulse begins to illuminate the photodetector 102 at a pulse start time. The photodetector 102 senses the light intensity and responsively generates the photodetector current, $I_{PD}$, at a level corresponding to light intensity as the light 101 continues to illuminate the photodetector 102. The photodetector 102 continues to generate the photodetector current according to the light intensity until the pulse end time, which is the time at which the light pulse ends and the light intensity goes to substantially zero. The light pulse may be characterized as having a period t, which is the elapsed time between the pulse start time and the pulse end time. The light pulses may also be separated by periods of no light according to a duty cycle of the excitation light.

The first integrator circuit 104 and the second integrator circuit 106 may be typical analog integrator circuits that generate an electrical output signal representing an integral of the input electrical signal. The first integrator circuit 104 and the second integrator circuit 106 perform substantially simultaneous integrations on the photodetector current level of the photodetector current, $I_{PD}$, over the period, t, of the light pulse. At the end of the period t, an integrator output signal indicates the integration of the current level of the photodetector current, $I_{PD}$, over the period of time t. The first integrator circuit 104 and the second integrator circuit 106 connect to opposite terminals of the photodetector 102 and generate an output voltage signal representing the integral of the photodetector current, $I_{PD}$, as detected from opposite sides of the photodetector 102. The first integrator 104 generates a first voltage signal, $V_{out,1}$, and the second integrator 106 generates a second voltage signal, $V_{out,2}$. As configured, the first integrator circuit 104 and the second integrator circuit 106 provide output signals $V_{out,1}$ and $V_{out,2}$ where: $V_{out,2} = -V_{out,1}$, and $|V_{out,1}| = |V_{out,2}|$; and where it is noted that component tolerances and differences in the component characteristics are ignored.

The output signals $V_{out,1}$ and $V_{out,2}$ are communicated to the inputs of the differential amplifier 108. The differential amplifier 108 generates an output representing the difference between the two input signals. For the example illustrated in FIG. 1, the differential amplifier 108 output is a third voltage signal, $V_{out,3}$ where:

$$V_{out,3} = V_{out,1} - V_{out,2} = V_{out,1} - (-V_{out,1}) = V_{out,1} + V_{out,1} = 2 * V_{out,1}.$$

The third voltage signal, $V_{out,3}$, of the differential amplifier 108 is communicated to the ADC function 110, which may include an n-bit ADC for converting the third voltage signal, $V_{out,3}$, to an n-bit digital value. The n-bit digital value of the third voltage signal may then be input to a controller to provide to a function that processes and analyzes n-bit digital values for information about the sample. For example, the absorbance detection system 150 may perform data analysis using the n-bit digital values collected for absorbance measurements taken by the photodetector 102 and the system 100 in FIG. 1 in running diagnostic assays. The diagnostic assays may be configured for purposes of determining, for example, the quantity of a target analyte in the sample.

The system 100 in FIG. 1 may include a reset signal input 112 for receiving a reset signal from a process that controls the operation of the system 100 in FIG. 1. For example, the process (not shown) may receive a trigger, or some input signal indicating when the analog-to-digital conversion has been completed by the ADC function 110. The process may then generate the reset signal, which is communicated to the first integrator circuit 104 and the second integrator circuit 106. The reset signal triggers a reset of the first integrator circuit 104 and the second integrator circuit 106 permitting the first integrator circuit 104 and the second integrator circuit 106 to restart a next integration when a next light pulse is received at the photodetector 102.

Figure 2:
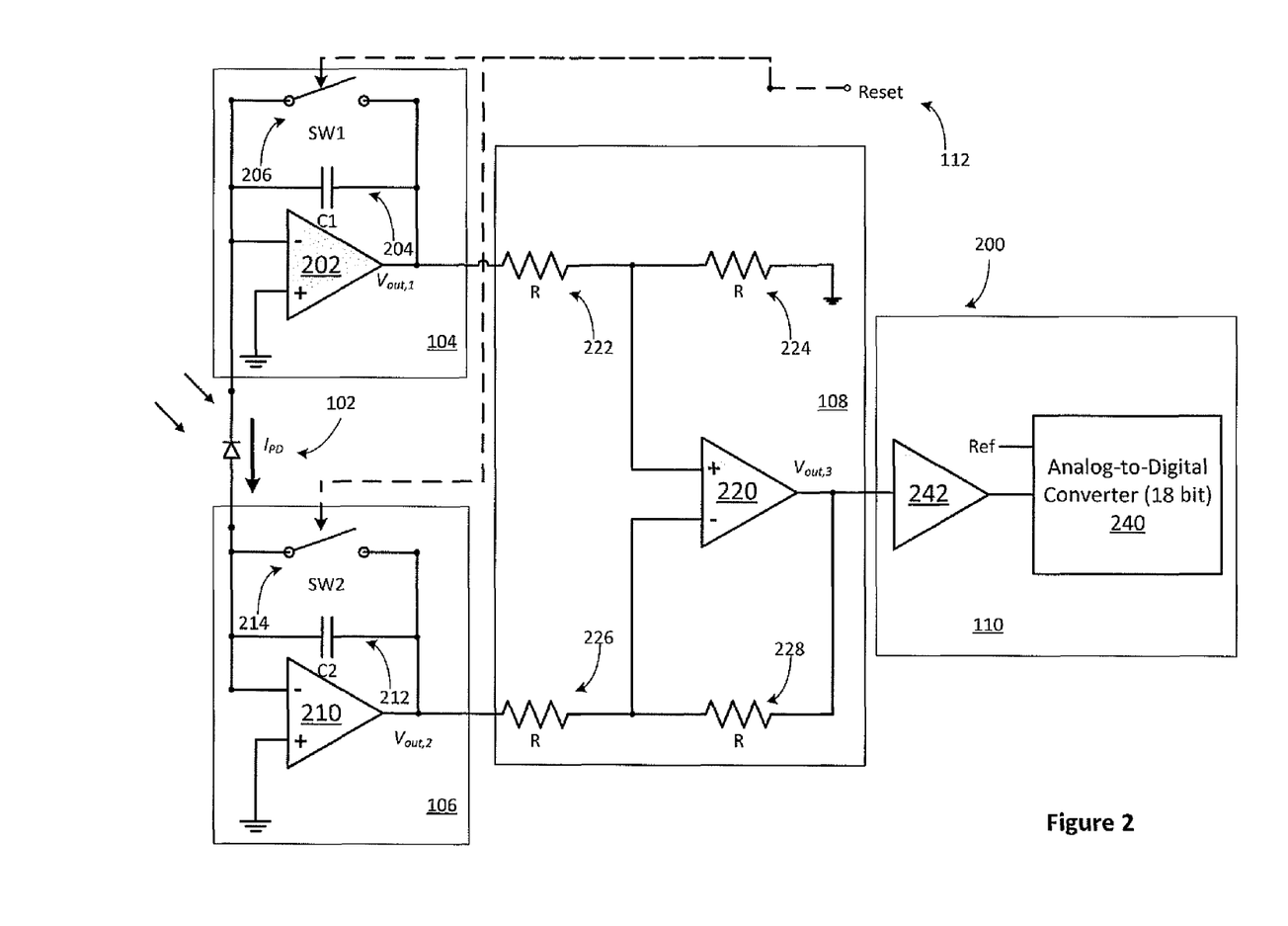
FIG. 2 is a schematic diagram of an example implementation of a circuit for measuring a light level according to the system in FIG. 1.

FIG. 2 is a schematic diagram of an example implementation of a differential integrator circuit 200 for measuring a light level according to the system in FIG. 1. As shown in FIG. 2, the first integrator 104 includes a first operational amplifier ("op-amp") 202, a first feedback capacitor 204, and a first integrator switch 206. Similarly, the second integrator 106 includes a second op-amp 210, a second feedback capacitor 212, and a second integrator switch 214. The first photodetector terminal 102a of the photodetector 102 is connected to a negative input terminal of the first op-amp 202 in the first integrator 104. The second terminal 102b of the photodetector 102 is connected to the negative terminal of the second op-amp 210 in the second integrator 106.

The first feedback capacitor 204 includes a first capacitor lead connected to the negative input terminal of the first op-amp 202 and a second capacitor lead connected to an output terminal of the first op-amp 202. The second feedback capacitor 212 includes a capacitor lead connected to the negative input terminal of the second op-amp 210 and a second capacitor lead connected to an output terminal of the second op-amp 210.

The transfer function of the first integrator circuit 104 as shown in FIG. 2 may be expressed as:

$$V_{out,1} = \frac{1}{C_1}\int I_{PD}(t)dt,$$

where $C_1$ is the capacitance of the first feedback capacitor 204.

The transfer function of the second integrator circuit 106 as shown in FIG. 2 may be expressed as:

$$V_{out,2} = \frac{1}{C_2}\int -I_{PD}(t)dt,$$

where $C_2$ is the capacitance of the second feedback capacitor 212. The first feedback capacitor 204 and the second feedback capacitor 212 in the differential integrator circuit 200 in FIG. 2 are selected to have the same capacitance value: $C_1=C_2$ for the example shown in FIG. 2. This results in $V_{out,2}=-V_{out,1}$, and $|V_{out,1}|=|V_{out,2}|$ as described above with reference to FIG. 1.

The differential amplifier 108 in FIG. 2 includes a differential amplifier op-amp 220, a first voltage divider formed by a first resister 222 and a second resister 224, and a second voltage divider formed by a third resister 226 and a fourth resister 228. The first voltage divider is connected to the positive input of the differential amplifier op-amp 220 at the node between the first resistor 222 and the second resistor 224. The first resistor 222 connects to an input of the differential amplifier 106, which connects to receive the first voltage signal $V_{out,1}$. The second voltage divider is connected to the negative input of the differential amplifier op-amp 220 at the node between the third resistor 226 and the fourth resistor 226. The third resistor 224 connects to an input of the differential amplifier 106, which connects to receive the second voltage signal $V_{out,2}$. In operation, the differential amplifier op-amp 220 generates a third voltage signal $V_{out,3}$, as the difference between the first voltage signal $V_{out,1}$ and second voltage signal $V_{out,2}$.

The third voltage signal $V_{out,3}$ is communicated to the ADC function 110. The ADC function 110 includes an 18-bit analog-to-digital convertor ("ADC") 240 and an ADC driver 242. It is to be understood by those of ordinary skill in the art that the 18-bit ADC is used as an example for an n-bit ADC. The third voltage signal $V_{out,3}$ is communicated to the ADC driver 242, which may be a driver, or an amplifier provided to scale the value for range of the ADC 240. The third voltage signal $V_{out,3}$ is converted to a digital value, an 18-bit value in the example in FIG. 2, which may then be processed to determine the desired information from the measurement.

The first integrator switch 206 is connected in parallel with the first feedback capacitor 204 to short the first feedback capacitor 204 when the first integrator switch 206 is closed. The second integrator switch 214 is connected in parallel with the second feedback capacitor 212 to short the second feedback capacitor 212 when the second integrator switch 214 is closed. The first integrator switch 206 and the second integrator switch 214 are triggered to close by the reset signal 112. The reset signal 112 may be generated by a controller or another circuit configured to control the measurement of light by the differential integrator circuit 200. The reset signal 112 may be generated at the conclusion of a conversion of the third output voltage to the digital value to enable another integration to begin for a next light pulse.

Figure 3:
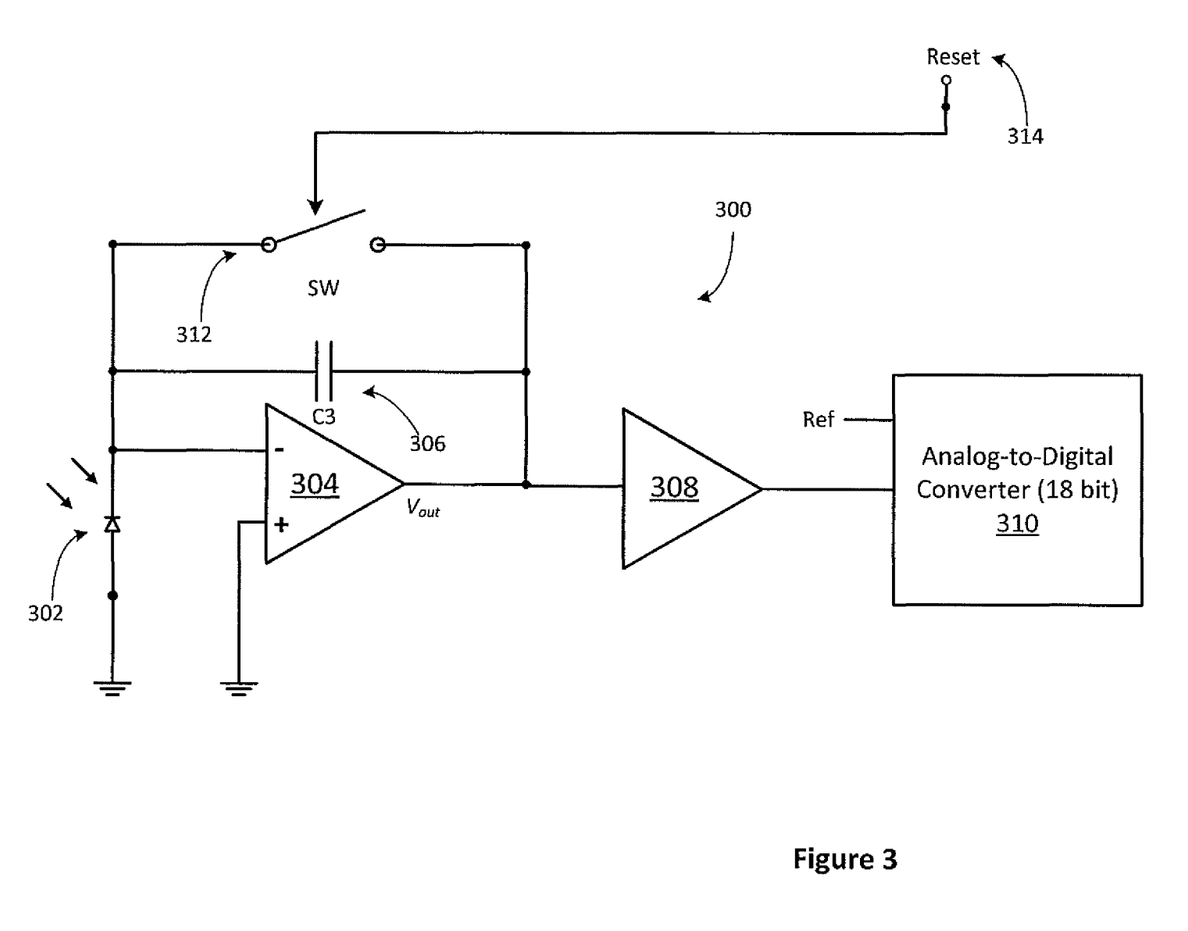
FIG. 3 is a schematic view of a photodetector connected to a single integrator circuit.

The differential integrator circuit 200 in FIG. 2, which is an example of the system 100 in FIG. 1, provides light measurements with a significantly improved dynamic range and signal-to-noise ratio ("SNR"). The improvements in both dynamic range and SNR may become apparent by comparison with a typical photodiode integrator circuit. FIG. 3 is a schematic view of a photodetector connected to a single integrator circuit of a type typically used to make light measurements with the photodetector. The circuit 300 in FIG. 3 includes a photodiode 302, an integrator op-amp 304, a feedback capacitor 306, a switch 312, an ADC driver 308 and an n-bit ADC 310. The photodiode integrator circuit 300 in FIG. 3 operates, as is well known to those of ordinary skill in the art, according to the transfer function:

$$V_{out} = \frac{1}{C_3}\int I_{PD}(t)dt.$$

The dynamic range of the photodiode integrator circuit 300 in FIG. 3 is limited by a DC offset due to a parasitic charge on the feedback capacitor 306 that is injected on the input of the integrator op-amp 304 when the switch SW 312 is opened. In contrast, referring to the differential integrator circuit 200 in FIG. 2, the offset voltages caused by the opening of the first integrator switch SW1 206 and the second integrator switch SW2 214, are subtracted by the differential amplifier 108. The resulting offset that remains at the third voltage signal $V_{out,3}$ is very small. This translates to a much improved dynamic range compared to that of the typical photodiode integrator 300.

With respect to a desired SNR, the noise added by the photodiode integrator 300 must be a very small value. The photodiode integrator 300 typically produces noise at the photodiode 302, the integrator op-amp 304, and the switch 312. The feedback capacitor $C_3$ 306 operates to limit the noise amplitude. Accordingly, a larger capacitance value $C_3$ would help reduce the noise contributed by the photodiode integrator 300. However, if the capacitance value $C_3$ is too high, the output voltage $V_{out}$ is limited in magnitude according to the transfer function for $V_{out}$ above. The integration time is limited by duration of as flash, or the period of the light pulse, t, and the current $I_{PD}$ is a function of the photodiode sensitivity at a certain wavelength and the photodiode input power.

Referring to the differential integrator circuit 200 in FIG. 2, the photodetector current level, $I_{PD}$, charges two integration capacitors (first and second feedback capacitors 204 & 212) simultaneously. In addition, the output voltages ($V_{out1}$ and $V_{out2}$) at both stages are added to one another. The essentially double output voltage signal generated at a constant light at the photodetector 102 may be compared to the single integrator operating in the photodiode integrator circuit 300 in FIG. 3. In order to obtain a similar range of output voltages from integration, the feedback capacitor value, $C_1$, in the first integrator circuit 104, and the feedback capacitor value, $C_2$, in the second integrator circuit 106, may each be doubled in order to generate the same output voltage value. For an differential integrator circuit 200 that is equivalent in output to the photodiode integrator circuit 300 in FIG. 3, the feedback capacitance values may be adjusted as follows: $C_1=C_2=2C_3$, and $C_{sys}=C1+C2=4C3$. Therefore, the differential integrator circuit 200 reduces photodiode noise by incorporating 4× times the capacitance of the single integrator photodiode integrator circuit 300. This results in a direct and significant improvement in the SNR delivered by the differential integrator circuit 200.

Figure 4A:
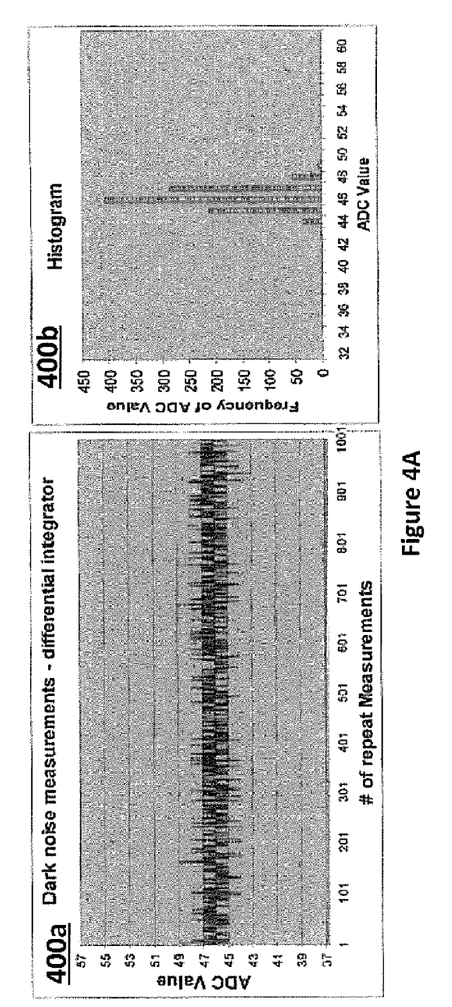
FIGS. 4A and 4B are diagrams illustrating differences in performance between the example implementation in FIG. 2 and the single integrator circuit in FIG. 3.
Figure 4B:
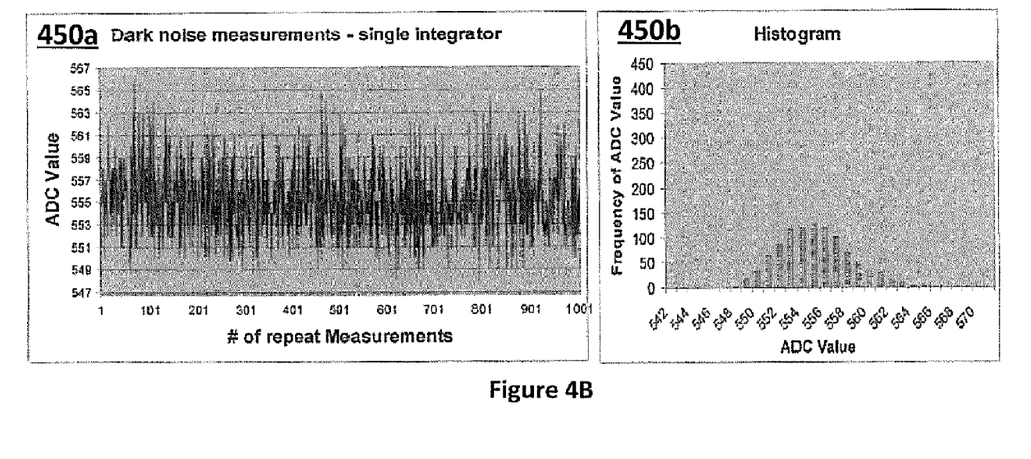

FIGS. 4A and 4B are diagrams graphically illustrating differences in performance between the example differential integrator circuit 200 in FIG. 2 and the photodiode single integrator circuit 300 in FIG. 3. The same scale is used for the diagrams and histograms generated for each implementation. FIG. 4A illustrates results 400 in tests performed on an example implementation of the differential integrator circuit 200 in FIG. 2. FIG. 4B illustrates results 450 in tests performed on an example implementation of the photodiode integrator circuit 300 in FIG. 3. The results 400 for the differential integrator circuit 200 demonstrate an improvement in noise performance by a factor of about 3.3, which is equivalent to a the performance of a conventional photodiode integrator 300 operating with about a 10× higher light input.

FIGS. 4A and 4B also provide an indication of the average ADC values obtained for the differential integrator circuit 200 and the photodiode integrator circuit 300, respectively. The average ADC values represent the DC voltage offsets of each measurement system. As shown in FIG. 4B, the average ADC value for the photodiode integrator circuit 300 is about 555 and the average ADC value for the differential integrator circuit 200 is about 46, representing an improvement in dynamic range.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A photodetector measurement circuit comprising:
a photodetector configured to receive a light having a light intensity and to generate a photodetector current with a current level indicative of the light intensity, the photodetector having a first terminal and a second terminal where the photodetector current flows through the photodetector from the first terminal towards the second terminal;
a first integrator coupled along a first signal path to the first terminal of the photodetector, where the first integrator is configured to generate a first voltage signal at a first integrator output indicative of an integral of the photodetector current level;
a second integrator coupled along a second signal path to the second terminal of the photodetector, where the second integrator is configured to generate a second voltage signal at a second integrator output indicative of an integral of the photodetector current level; and
a differential amplifier configured to receive the first voltage signal at a first differential amplifier input, to receive the second voltage signal at a second differential amplifier input, and to generate a third output signal at a differential amplifier output indicative of a difference between the first voltage signal and the second voltage signal, where the differential amplifier is further configured to output the third voltage signal along a fifth signal path to an analog-to-digital conversion function ("ADC function") input.

2. The photodetector measurement circuit of claim 1, further comprising:
a reset input connection connected along a reset signal path to a first integrator switch configured to reset the first integrator, and to a second integrator switch configured to reset the second integrator when a reset signal is generated on the reset input connection.

3. The photodetector measurement circuit of claim 1, where:
the first integrator includes a first integrator operational amplifier ("op-amp") coupled to the first terminal of the photodetector via the first signal path at a negative terminal of the first integrator op-amp, the first integrator op-amp comprising a first op-amp output in signal connection with the first integrator output; and
the second integrator includes a second integrator op-amp coupled to the second terminal of the photodetector via the second signal path at a negative terminal of the second integrator op-amp, the second integrator op-amp comprising a second op-amp output in signal connection with the second integrator output.

4. The photodetector measurement circuit of claim 3, where:
the first integrator includes a first feedback capacitor coupled to the negative terminal of the first integrator op-amp at a first capacitor lead and to the first op-amp output at a second capacitor lead, the first feedback capacitor having a selected capacitance; and
the second integrator includes a second feedback capacitor coupled to the negative terminal of the second integrator op-amp at a first capacitor lead and to the second op-amp output at a second capacitor lead, the second feedback capacitor having approximately the same selected capacitance as the first feedback capacitor.

5. The photodetector measurement circuit of claim 2, where:
the first integrator includes a first feedback capacitor connected in parallel with the first integrator switch that resets the first integrator, the first feedback capacitor comprising a first capacitor lead connected along a first op-amp feedback signal path to the negative terminal of the first integrator op-amp and a first integrator switch terminal of the first integrator switch, and a second capacitor lead connected along the feedback signal path to the first op-amp output and a second integrator switch terminal of the first integrator switch, the first feedback capacitor having a selected capacitance; and
the second integrator includes a second feedback capacitor connected in parallel with the second integrator switch that resets the second integrator, the second feedback capacitor comprising a first capacitor lead connected along a second op-amp feedback signal path to the negative terminal of the second integrator op-amp and a second integrator switch terminal of the second integrator switch, and a second capacitor lead connected along the second op-amp feedback signal path to the second op-amp output and a second integrator switch terminal of the second integrator switch, the second feedback capacitor having approximately the same selected capacitance as the first feedback capacitor.

6. The photodetector measurement circuit of claim 1, where:
the differential amplifier comprises a differential amplifier op-amp comprising a positive input in signal communication with the first differential amplifier input and a negative input in signal communication with the second differential amplifier input.

7. The photodetector measurement circuit of claim 6, where:
the positive input of the differential op-amp connects to the first differential amplifier input at a first voltage divider formed by a first and second resistor; and
the negative input of the differential op-amp connects to the second differential amplifier input at a second voltage divider formed by a third and fourth resistor, where the first, second, third and fourth resistors have substantially the same resistance value.

8. The photodetector measurement circuit of claim 1, where:

the ADC function includes an N-bit analog-to-digital converter ("ADC") configured to generate an N-bit data word representing an analog value of the third output signal.

9. The photodetector measurement circuit of claim 8, where:
the ADC function includes an ADC driver configured to scale the analog value in accordance with a dynamic range of the N-bit ADC.

10. The photodetector measurement circuit of claim 1, where the photodetector is a photodiode.

11. A method for measuring a light intensity level using a photodetector comprising:
receiving a light signal at the photodetector;
generating a photodetector current having a photodetector current level in response to the light signal intensity from a first photodetector terminal to a second photodetector terminal;
sensing the photodetector current at a first integrator input at the first photodetector terminal;
generating a first output signal at a first integrator output, the first output signal indicative of an integral of the photodetector current level;
sensing the photodetector current at a second integrator input at the second photodetector terminal;
generating a second output signal at a second integrator output, the second output signal indicative of an integral of the photodetector current level;
receiving the first output signal at a positive differential amplifier input and the second output signal at a negative differential amplifier input;
generating a third output signal indicative of the difference between the first output signal and the second output signal; and
outputting the third output signal to an analog-to-digital converter ("ADC").

12. The method of claim 11, further comprising:
generating a reset signal when the ADC has generated a digital value corresponding to the third output signal;
resetting the first and second integrators using the reset signal.

13. The method of claim 12, where the step of resetting the first and second integrators includes:
shorting a first feedback capacitor in the first integrator by triggering a first integrator switch closed; and
shorting a second feedback capacitor in the second integrator by triggering a second integrator switch closed.

14. The method of claim 11, where the light signal is received as series of light pulses having a pulse time width, where:
the step of generating the photodetector current level includes beginning step of generating the photodetector current level at a beginning of one of the light pulses;
the steps of sensing the photodetector current level at the first and second integrators include initiating the steps of sensing the photodetector current levels at the beginning of the one of the light pulses;
the steps of generating the first and second output signals include generating the first and second outputs at a signal level corresponding to the first and second output signal levels present at a conclusion of the one of the light pulses; where:
the sensing of the photodetector current level by the first and second integrators begin simultaneously with the beginning of the light pulse and the first and second output signals are generated simultaneously with the conclusion of the light pulse.

15. The method of claim 14, further comprising:
generating a reset signal when the ADC has generated a digital value corresponding to the third output signal;
resetting the first and second integrators using the reset signal, where the reset signal is generated before receiving a next light pulse.

16. The method of claim 14, where the light pulses are generated by a sample in response to excitation by light received from a flash lamp.

17. A detection system comprising:
an absorbance detection system configured to generate a light having a light intensity indicative of an absorbance by a sample in response to an excitation light;
a plurality of optical components configured to provide an optical path from the sample to a measurement
a photodetector measurement circuit comprising:
a photodetector configured to receive the light and to generate a photodetector current with a current level indicative of the light intensity, the photodetector having a first terminal and a second terminal where the photodetector current flows through the photodetector from the first terminal towards the second terminal;
a first integrator coupled along a first signal path to the first terminal of the photodetector, where the first integrator is configured to generate a first voltage signal at a first integrator output indicative of an integral of the photodetector current level;
a second integrator coupled along a second signal path to the second terminal of the photodetector, where the second integrator is configured to generate a second voltage signal at a second integrator output indicative of an integral of the photodetector current level; and
a differential amplifier configured to receive the first voltage signal at a first differential amplifier input, to receive the second voltage signal at a second differential amplifier input, and to generate a third output signal at a differential amplifier output indicative of a difference between the first voltage signal and the second voltage signal, where the differential amplifier is further configured to output the third voltage signal along a fifth signal path to an analog-to-digital conversion function ("ADC function") input.

18. The detection system of claim 17, where the photodetector measurement circuit further comprises:
a reset input connection connected along a reset signal path to a first integrator switch configured to reset the first integrator, and to a second integrator switch configured to reset the second integrator when a reset signal is generated on the reset input connection; and where:
the first integrator includes a first feedback capacitor connected in parallel with the first integrator switch that resets the first integrator, the first feedback capacitor comprising a first capacitor lead connected along a first op-amp feedback signal path to the negative terminal of the first integrator op-amp and a first integrator switch terminal of the first integrator switch, and a second capacitor lead connected along the feedback signal path to the first op-amp output and a second integrator switch terminal of the first integrator switch, the first feedback capacitor having a selected capacitance; and
the second integrator includes a second feedback capacitor connected in parallel with the second integrator switch that resets the second integrator, the second feedback capacitor comprising a first capacitor lead connected along a second op-amp feedback signal path to the negative terminal of the second integrator op-amp and a second integrator switch terminal of the second integrator switch, and a second capacitor lead connected along the second op-amp feedback signal path to the second op-amp output and a second integrator switch terminal of the second integrator switch, the second feedback capacitor having approximately the same selected capacitance as the first feedback capacitor.

19. The detection system of claim 17, where:
the differential amplifier of the photodetector measurement circuit comprises a differential amplifier op-amp comprising a positive input in signal communication with the first differential amplifier input and a negative input in signal communication with the second differential amplifier input.

20. The detection system of claim 19, where:
the positive input of the differential op-amp connects to the first differential amplifier input at a first voltage divider formed by a first and second resistor; and
the negative input of the differential op-amp connects to the second differential amplifier input at a second voltage divider formed by a third and fourth resistor, where the first, second, third and fourth resistors have substantially the same resistance value.

* * * * *